Figure 1:
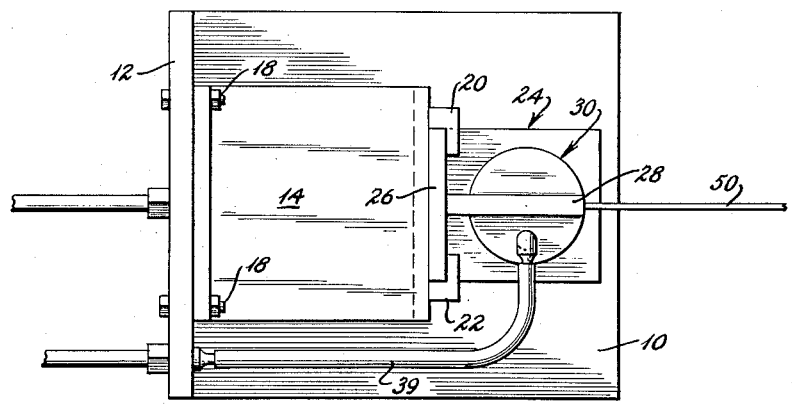

Jan. 10, 1961 J. U. MORRIS 2,967,537
CONTROL APPARATUS RESPONSIVE TO A PLURALITY
OF INDEPENDENTLY VARIABLE PRESSURES
Filed Dec. 3, 1958 2 Sheets-Sheet 1

INVENTOR
John U. Morris

BY Mead, Browne, Schuyler & Beveridge
ATTORNEYS

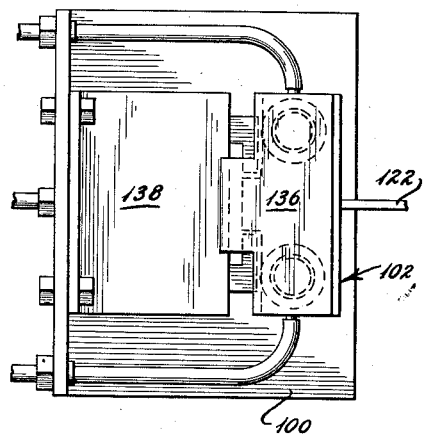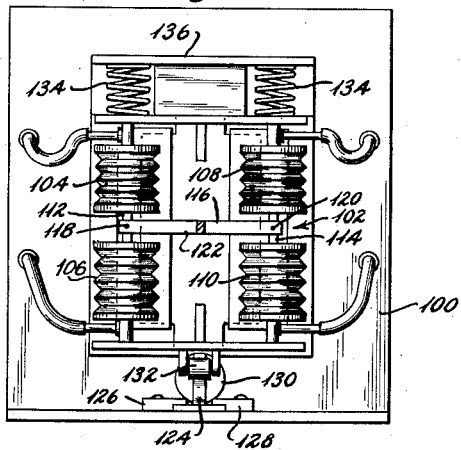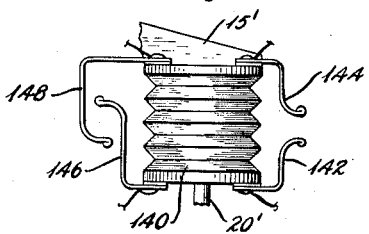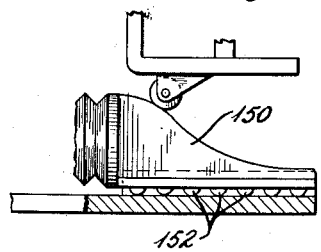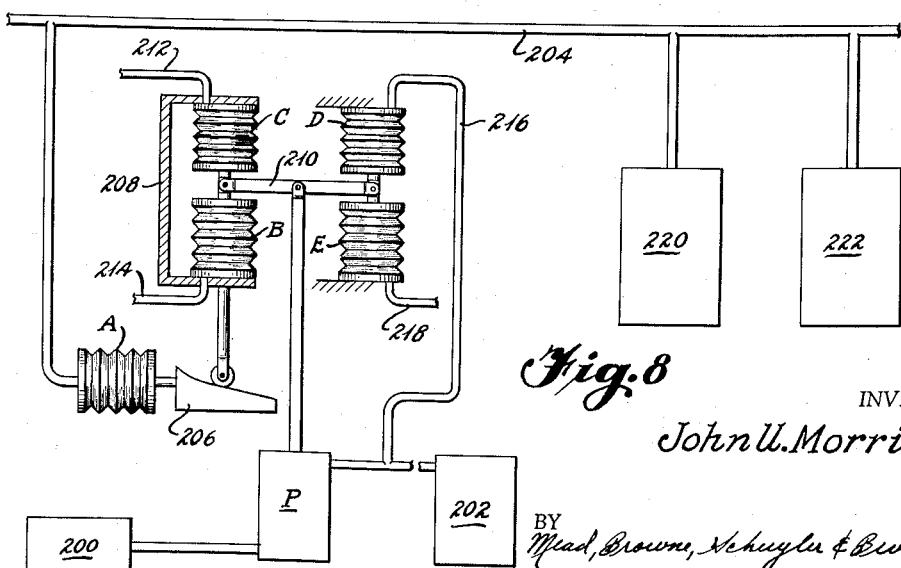

United States Patent Office 2,967,537
Patented Jan. 10, 1961

2,967,537
CONTROL APPARATUS RESPONSIVE TO A PLURALITY OF INDEPENDENTLY VARIABLE PRESSURES
John U. Morris, R.D. 6, Oswego, N.Y.
Filed Dec. 3, 1958, Ser. No. 778,029
7 Claims. (Cl. 137—82)

This invention relates to control apparatus responsive to multiple variable conditions, and more particularly to apparatus of this general type wherein a control member is positioned in accordance with a plurality of independently variable control conditions, such as pressures, for example.

The control device of the present invention is designed especially for use in systems where a plurality of auxiliary control devices are employed in the operation of a main device. One example of such a system is that of a steam-electric generating unit in which various auxiliary devices such as fans, feed pumps, and fuel supplying devices must be regulated accurately in accordance with the load on the generator. In the past, rapid response of a control device in such a system was not of extreme importance due to the relatively large capacitance of the system. In modern plants of this type however, the increasing use of super-critical boilers requires control devices in which the response of auxiliary devices must rapidly reflect variations in load on the generator.

In considering the operation of an auxiliary device, such as a fan, it is apparent that under a steady load condition on the generator, there is a given control setting which corresponds to the most efficient operation of the fan. In addition to the steady state condition, every time the load on the main unit is changed, the control device must be reset to conform to the new steady state condition. During the change from one setting to another, there exists a transient condition in which the steady state position of the control device does not necessarily conform to most efficient operation. The transient condition may be conveniently illustrated in the case of a fan during the change from one operating speed to a lower operating speed. In this case, inertia of the fan tends to maintain the fan at the higher speed. Thus, in addition to establishing the lower steady state condition, it is also necessary to allow for the inertia by reducing the input to the fan below the eventual steady state condition to take advantage of the inertia and also to reduce the length of time required for the transition between one steady state condition and the lower steady state condition.

In addition to the transient corrections, it is sometimes desirable to manually override the operation of the control device for various purposes.

Accordingly, it is a primary object of the present invention to provide a control device which is responsive to a plurality of control conditions which may include steady state conditions, transient conditions and manual control conditions.

It is another object of the invention to provide a control device responsive to a plurality of control conditions which permits manual control without increasing the complexity of the system.

It is another object of the invention to provide a control device responsive to a plurality of control conditions in which the number of conditions to which the device is to be responsive may be increased with only minor structural variations to the device.

In the achievement of these and other objects, an apparatus is constructed to include a fixed frame having a carriage mounted on the frame for movement relative to the frame over a fixed path. A pair of opposed pressure responsive devices in the form of bellows are mounted upon the carriage and coupled to a control member in a manner such that the control member is positioned relative to the carriage in accordance with the algebraic sum of the forces exerted by the control pressures supplied to the respective bellows, i.e., the net movement of the bellows pair to a position where the forces exerted are in equilibrium. The carriage is positioned upon the frame in accordance with the position of a cam which is controlled by still a third bellows mounted to drive the cam to selected positions upon the frame in accordance with a control pressure derived from a third source. A control arm is coupled to the carriage to actuate the valve or device being controlled.

When employed in a system such as a steam generating unit discussed above, the steady state condition is preferably established under the control of the third bellows and cam. By modifying the shape of the cam, the necessary non-linear relationship between a master control pressure which may be derived from a system parameter such as main unit load, can be obtained to position the control device for most efficient operation of the particular auxiliary control. Employment of a specifically shaped cam enables the single master control pressure to operate all of the various auxiliary devices such as fans, feed pumps, etc. One of the pair of opposed bellows mounted upon the carriage is preferably connected to an automatically derived control pressure which is responsive to inertia or an analogous quantity whereby the desired transient control may be superimposed upon the carriage position. The other bellows of the pair may be coupled to a manual override which, in effect, may be said to permit variation of the effective shape of the cam at the desire of the operator.

Other objects and advantages of the invention will become apparent from the following specification taken in conjunction with the accompanying drawings.

Figure 3:
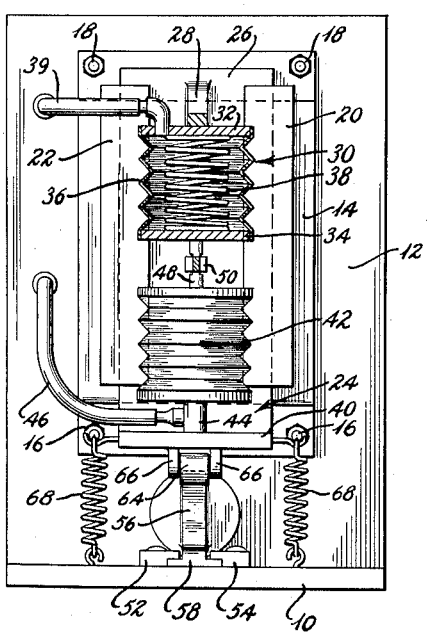
Figure 2:
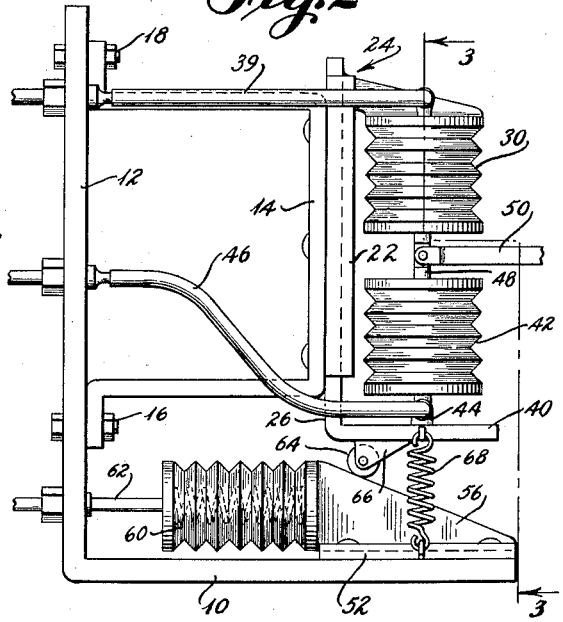

In the drawings:
Fig. 1 is a plan view of a control device embodying the present invention;
Fig. 2 is a side elevational view of the control device of Fig. 1;
Fig. 3 is a front view, partially in section, of the device of Figs. 1 and 2, the section being taken on line 3—3 of Fig. 2;
Fig. 4 is a plan view of a modified form of control device;
Fig. 5 is a front view of the control device of Fig. 4;
Fig. 6 is a side elevational view of a bellows assembly suitable for use in either of the above embodiments and provided with an electrical contact means;
Fig. 7 is a modified form of cam assembly suitable for use in any of the above described embodiments; and
Fig. 8 is a schematic diagram of a system employing the control device of Figs. 1 through 3.

In the embodiment shown in Figs. 1–3, the control device includes a frame having a base 10 and an integral vertical plate 12 projecting upwardly from one side of base 10. A U-shaped bracket 14 is bolted to vertical plate 12 as at 16 and 18. On the outer side surface of bracket 14, a pair of spaced parallel guide tracks 20 and 22 are fixedly secured, as by welding, to define a path of movement for a slide or carriage designated generally 24. Carriage 24 includes a flat base plate 26 which is engaged between guide tracks 20 and 22 for guided sliding movement along the outer surface of bracket 14. At its upper end, a rigid projecting lug 28 is secured, as by welding, to plate 26 to serve as a mounting for a pressure responsive device in the form of a bellows 30.

Bellows 30 is of conventional construction and, as best seen in Fig. 3, includes upper and lower end plates, 32 and 34 respectively, which are connected to each other by the expansible bellows member 36. End plates 32 and 34 and bellows member 36 define an enclosed expansible chamber. End plates 32 and 34 are continuously biased toward each other by means of a tension spring 38 which is connected between the respective plates. As best seen in Fig. 3, end plate 32 is secured to arm 28 as by welding. A flexible conduit assembly 39 is connected through end plate 32 to supply air under pressure to the interior of the bellows.

At the opposite end of base plate 26, a rigid end plate 40 projects at right angles to plate 26 to form a mounting means for a second bellows 42 which is mounted upon a rigid conduit section 44 welded to plate 40. Bellows 42 is of a conventional construction substantially identical to bellows 30. Air is supplied to the interior of bellows 42 by a flexible supply conduit 46. The adjacent ends of bellows 30 and 42 are coupled to each other by a rigid link 48 to which is pivotally connected one end of a control arm 50 which is mounted for movement relative to both carriage 24 and the fixed frame elements. Reference may be made to Fig. 8 for one method of so mounting arm 50.

Directly below carriage assembly 24, a pair of opposed guide tracks 52 and 54 are fixedly secured to base plate 10. An inclined cam member 56 having a horizontal bottom flange 58 is received between guide tracks 52 and 54 to be guided in sliding movement by the tracks. Cam member 56 is driven in movement along the path defined by the guide tracks 52 and 54 by means of a third bellows 60 which is secured at one end to cam 56 and rigidly connected at its opposite end to vertical plate 10 by means of a short length of conduit 62.

Bellows 60 is substantially identical in construction to bellows 30 and 42. Pressure for operating bellows 60 is supplied through conduit 62 to the interior of the bellows.

The lower surface of plate 40 on carriage 24 is provided with a roller 64 rotatably supported from plate 40 by means of ears 66 which are welded to the plate. Roller 66 is located to be supported upon the inclined surface of cam 56 and is maintained in engagement with cam 56 by tension springs 68 connected between carriage 24 and base plate 10.

In Fig. 2, roller 64 is shown located adjacent the uppermost end of inclined cam 56. This is the position it would assume when bellows 60 is extended to substantially its maximum amount by the presence of a relatively high pressure contained within bellows 60. Upon the reduction of pressure within bellows 60, cam 56 is moved to the left in Fig. 2 and the inclined surface of cam 56 permits carriage 24 to move downwardly as cam 56 is moved toward the left. It is believed apparent that downward movement of carriage 24 will likewise cause control arm 50 to be moved downwardly from the position shown in Fig. 2.

The position of arm 50 is thus adjusted in accordance with the control pressure existing within bellows 60. In addition to this adjustment, the position of arm 50 is dependent upon the algebraic sum of the forces exerted by the respective control pressures supplied to bellows 30 and bellows 42. Assuming the control pressure supplied to bellows 30 to be greater than the control pressure supplied to bellows 42, bellows 30 will expand, reducing its internal pressure, and bellows 42 will be compressed, increasing its internal pressure until the opposed forces exerted by the bellows reach equilibrium. Another way of stating this is to say that arm 50 is positioned in accordance with the net movement of the bellows pair under the action of the respective control pressures. Thus, the embodiment shown in Figs. 1-3 discloses a structure which can position a control member such as the arm 50 in accordance with three variable conditions represented by the pressures respectively applied to bellows 30, 42 and 60.

A modified form of control device is shown in Figs. 4 and 5. In this embodiment, a fixed frame 100 is constructed to support a carriage 102 for guided movement in a fashion similar to that employed in the Figs. 1-3 embodiment. Carriage 102 differs from carriage 24 in that four bellows 104, 106, 108 and 110 are mounted in opposed pairs on carriage 102. A rigid link 112 connects the free ends of bellows 104 and 106 and a similar rigid link 114 connects the free ends of bellows 108 and 110. A connecting link 116 is pivotally coupled as at 118 and 120 to each of links 112 and 114. Control arm 122 is connected to link 116 at an intermediate point.

In the construction shown in Fig. 5, control arm 122 is connected to link 116 substantially midway between the points of connection 118 and 120 to the respective opposed bellows pairs. In such a situation, each of the opposed pairs of bellows can exert a similar action upon control arm 120. If, for example, it were desired to exert a greater control action from bellows 104 and 106 the connection between control arm 120 and link 116 could be shifted to a location somewhat closer to connection 118. It is believed apparent that this embodiment is capable of moving arm 122 relative to carriage 102 in accordance with the net algebraic sum of the forces exerted by bellows 104, 106, 108 and 110.

As in the previously described embodiment, the position of carriage 102 relative to frame 100 is established by means of an inclined cam 124 slidably mounted upon frame 100 and guided by tracks 126, 128. As in the previous case, cam 124 is coupled to be driven from a bellows 130 in exactly the same fashion as cam 56 is driven by bellows 60 in the embodiment of Figs. 1-3. A cam roller 132 is mounted upon carriage 102 in exactly the same fashion as roller 64 is mounted upon carriage 24 in the embodiment of Figs. 1-3. In the embodiment of Fig. 5, springs 134 bias carriage 102 downwardly to maintain roller 132 in contact with cam 124. Springs 134 are connected between the upper end of carriage 102 and an overhanging plate 136 which is rigidly secured to bracket portion 138 of frame 100.

In certain cases it is desirable to actuate various electrical devices such as indicator lights or alarms in accordance with the positions of the various bellows. In Fig. 6, a bellows 140 is disclosed as having a first pair of electrical contacts 142, 144 mounted upon the end plates of the bellows to complete an electrical circuit when the bellows are at their maximum compressed position. A pair of contacts such as 146, 148 may be mounted on the end plates of the bellows to indicate the arrival of the bellows at its maximum expanded position.

In the Fig. 1 embodiment, cam 56 is disclosed as having a straight inclined edge surface. In certain devices, it may be desirable to employ the other shapes of cams such as the cam 150 shown in Fig. 7. To reduce friction, the cam 150 may be supported on rollers 152.

In Fig. 8, one exemplary utilization of a control device embodying the present invention is shown in more or less block diagram form. In Fig. 8, the bellows A, B and C respectively may correspond to bellows 60, 42 and 30 of Fig. 2 while the bellows D and E may be mounted upon a fixed support. In the diagram of Fig. 8, the bellows are connected to control a pilot valve P connected in a pressure line to control the amount of pressure supplied from a source such as 200 to an auxiliary device such as 202.

Pressure for operating bellows A is supplied through a conduit 204 which is connected through a suitable arrangement to monitor the load applied to a main unit of which auxiliary device 202 is one of several operating controls. For purposes of explanation, it may be assumed that the pressure in conduit 204 is directly proportional to the load upon the main unit. Thus, pressure in bellows A positions the cam 206 which in turn elevates the carriage 208 carrying bellows B and C, thereby positioning a control link 210 which operates pilot valve P. It is believed apparent that by selecting the configuration of cam 206, such as suggested in Fig. 7, a pre-determined normal set point corresponding to the pressure in conduit 204 is achieved which in turn corresponds to a given opening of pilot valve P, assuming bellows B and C are in their normal positions. From the foregoing, it is believed apparent that during a steady state operation, pilot valve P is set to apply a given fixed pressure to auxiliary device 202, the particular pressure applied to the device 202 being directly determined in accordance with the load, as represented by the pressure in conduit 204.

While I have described certain exemplary embodiments of my invention, it will be apparent to those skilled in the art that the structures described above may be modified. Therefore, the foregoing specification is to be considered exemplary rather than limiting and the true scope of my invention is that defined in the following claims.

I claim:

1. A condition responsive positioning device comprising a frame, a carriage mounted on said frame for movement relative to said frame along a fixed path, a first condition responsive device for positioning said carriage at a selected position on said path in accordance with a first control condition, a pair of opposed condition responsive devices mounted on said carriage, means for moving one of said pair of devices in accordance with a second control condition, means for moving the other of said pair of devices in accordance with a third control condition, a control arm mounted for movement relative to said frame and said carriage, and means connecting said control arm between said pair of devices whereby said arm is positioned relative to said carriage in accordance with the net movement imparted to said pair of devices in accordance with said second and said third control conditions.

2. A condition responsive positioning device comprising a frame, a carriage mounted on said frame for movement relative to said frame along a fixed path, a cam mounted for movement on said frame, a cam follower on said carriage engageable with said cam, means for moving said cam to selected positions on said frame to position said carriage on said fixed path, a pair of movable condition responsive devices mounted on said carriage, means for moving one of said condition responsive devices in accordance with a first control condition, means for moving the other of said condition responsive devices in accordance with a second control condition, a control member mounted for movement relative to said frame and said carriage, and means coupling said control member to both of said condition responsive devices to position said control member relative to said carriage in accordance with the net movement of said condition responsive devices.

3. A pressure responsive positioning device comprising a frame, a carriage mounted on said frame for movement relative to said frame along a fixed path, a pair of pressure responsive devices mounted on said carriage, means for supplying pressure in accordance with a first control condition to one of said devices, means for supplying pressure in accordance with a second control condition to the other of said control devices, a control member mounted for movement relative to said frame and said carriage, means coupling said control member to both of said pressure responsive devices to position said control member relative to said carriage in accordance with the net movement of said pair of devices, a master pressure responsive device connected between said carriage and said frame to position said carriage at selected locations on said fixed path in accordance with pressure supplied to said master responsive device, and means for supplying pressure to said master pressure responsive device in accordance with a third control condition.

4. A pressure responsive positioning device comprising a frame, a carriage mounted on said frame for movement relative to said frame along a fixed path, a pair of pressure responsive devices mounted on said carriage, means for supplying pressure in accordance with a first control condition to one of said devices, means for supplying pressure in accordance with a second control condition to the other of said pressure responsive devices, a control member mounted for movement relative to said frame and said carriage, means coupling said control member to both said pressure responsive devices to position said control member relative to said carriage in accordance with the net movement of said pair of pressure responsive devices, a cam element mounted on said frame for movement relative to said frame along a predetermined path, a cam follower mounted on said carriage in engagement with said cam element to locate said carriage at selected positions on said fixed path in accordance with the position of said cam element on said predetermined path, a master pressure responsive device connected between said frame and said cam element to position said cam element on said predetermined path in accordance with pressure supplied to said master pressure responsive device, and means for supplying pressure to said master pressure responsive device in accordance with a third control condition.

5. A pressure responsive positioning device as defined in claim 4 wherein said pressure responsive devices comprise expansible bellows, at least one of said bellows having a pair of electrical contacts thereon engageable when a predetermined pressure is supplied to said bellows.

6. A condition responsive positioning device comprising a frame, a carriage mounted on said frame for movement along a fixed path, first condition responsive means for positioning said carriage on said path in accordance with a first control condition, a first pair of condition responsive devices mounted on said carriage, first means coupling said first pair of devices to each other, means for moving said first pair of devices in response to a second and a third control condition to position said first coupling means relative to said carriage in accordance with the net movement of said first pair of devices, a second pair of condition responsive devices mounted on said carriage, second means coupling said second pair of devices to each other, means for moving said second pair of devices in response to a fourth and a fifth control condition to position said second coupling means relative to said carriage in accordance with the net movement of said second pair of devices, link means connected between said first coupling means and said second coupling means and positioned relative to said carriage in accordance with the respective positions of said first coupling means and said second coupling means relative to said carriage, and a control arm connected to said link means for movement therewith.

7. A condition responsive positioning device as defined in claim 6 wherein said condition responsive means and said condition responsive devices comprise expansible bellows.

References Cited in the file of this patent

UNITED STATES PATENTS

| | | |
|---|---|---|
| 2,507,498 | Brown | May 16, 1950 |
| 2,521,477 | Pelletlere | Sept. 5, 1950 |
| 2,563,374 | Rosenberger | Aug. 7, 1951 |
| 2,643,055 | Sortenberg | June 23, 1953 |
| 2,659,531 | Thoresen | Nov. 17, 1953 |
| 2,736,199 | Ibbott | Feb. 28, 1956 |
| 2,771,897 | Bailey | Nov. 27, 1956 |
| 2,800,136 | Bowditch | July 23, 1957 |
| 2,851,048 | Hutchinson | Sept. 9, 1958 |
| 2,852,942 | Gerard | Sept. 23, 1958 |
| 2,860,650 | Schink | Nov. 18, 1958 |
| 2,867,229 | Shannon | Jan. 6, 1959 |
| 2,888,940 | Jordan | June 2, 1959 |

OTHER REFERENCES

Fundamentals of Automatic Control, by G. H. Farrington, published 1951 by Chapman and Hall Ltd., London, pages 255–271.